(12) United States Patent
Lohr et al.

(10) Patent No.: US 9,929,388 B2
(45) Date of Patent: Mar. 27, 2018

(54) TRACTION BATTERY ASSEMBLY

(71) Applicant: Ford Global Technologies, LLC, Dearborn, MI (US)

(72) Inventors: Jonathan Lohr, Canton, MI (US); Hyung Min Baek, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 462 days.

(21) Appl. No.: 14/694,388

(22) Filed: Apr. 23, 2015

(65) Prior Publication Data
US 2016/0315298 A1   Oct. 27, 2016

(51) Int. Cl.
| | |
|---|---|
| *H01M 2/02* | (2006.01) |
| *H01M 2/10* | (2006.01) |
| *H01M 10/625* | (2014.01) |
| *H01M 2/20* | (2006.01) |
| *B60L 11/18* | (2006.01) |
| *H01M 10/6557* | (2014.01) |
| *H01M 2/12* | (2006.01) |
| *H01M 10/04* | (2006.01) |

(52) U.S. Cl.
CPC ....... *H01M 2/1077* (2013.01); *B60L 11/1877* (2013.01); *H01M 2/206* (2013.01); *H01M 10/625* (2015.04); *H01M 10/6557* (2015.04); *H01M 2/12* (2013.01); *H01M 10/0481* (2013.01); *H01M 2220/20* (2013.01)

(58) Field of Classification Search
CPC ...................................... H01M 2/02
See application file for complete search history.

(56) References Cited

U.S. PATENT DOCUMENTS

| | | | |
|---|---|---|---|
| 8,895,177 | B2 | 11/2014 | Marchio et al. |
| 2010/0136390 | A1* | 6/2010 | Ueda ............ H01M 10/441 429/61 |
| 2011/0045334 | A1 | 2/2011 | Meintschel et al. |
| 2012/0129024 | A1 | 5/2012 | Marchio et al. |
| 2014/0322582 | A1 | 10/2014 | Rüter et al. |

FOREIGN PATENT DOCUMENTS

WO    2014029566 A1    2/2014

* cited by examiner

*Primary Examiner* — Jacob Marks
(74) *Attorney, Agent, or Firm* — David Kelley; Brooks Kushman, P.C.

(57) ABSTRACT

A traction battery assembly includes first and second arrays each having cells with terminals on a terminal side of the array. The arrays are arranged with the terminal sides facing each other. A thermal plate is disposed between the arrays and is in contact with the terminal sides. A busbar mechanically and electrically connects a terminal of a cell in the first array to a terminal of a cell in the second array.

19 Claims, 3 Drawing Sheets

TRACTION BATTERY ASSEMBLY

TECHNICAL FIELD

The present disclosure relates to traction battery assemblies for motor vehicles.

BACKGROUND

Vehicles such as battery-electric vehicles and hybrid-electric vehicles contain a traction battery assembly to act as an energy source for the vehicle. The traction battery may include components and systems to assist in managing vehicle performance and operations. The traction battery may also include high voltage components, and an air or liquid thermal-management system to control the temperature of the battery.

SUMMARY

According to one embodiment, a traction battery assembly includes first and second arrays each having cells with terminals on a terminal side of the array. The arrays are arranged with the terminal sides facing each other. A thermal plate is disposed between the arrays and is in contact with the terminal sides. A busbar mechanically and electrically connects a terminal of a cell in the first array to a terminal of a cell in the second array.

According to another embodiment, a traction battery assembly includes first and second arrays each having cells with terminals on a terminal side of the array. The arrays are arranged with the terminal sides facing each other. A cell of the first array is mechanically and electrically coupled to a coplanar cell of the second array via a first busbar and to another cell of the second array that abuts the coplanar cell via a second busbar.

According to yet another embodiment, a traction battery assembly includes first and second arrays each having a plurality of cells with a pair of opposing major sides. The cells are arranged in a stack such that the major sides of adjacent cells face each other. Each of the cells has terminals on a terminal side that extends between the major sides. A first cell of the first array and a second cell of the second array are coplanar with respect to each other and are arranged with the terminal sides facing each other. The first cell is mechanically and electrically coupled to the second cell by a first busbar and is mechanically and electrically coupled to a third cell by a second busbar. The third cell is in the second array and is adjacent to the second cell.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
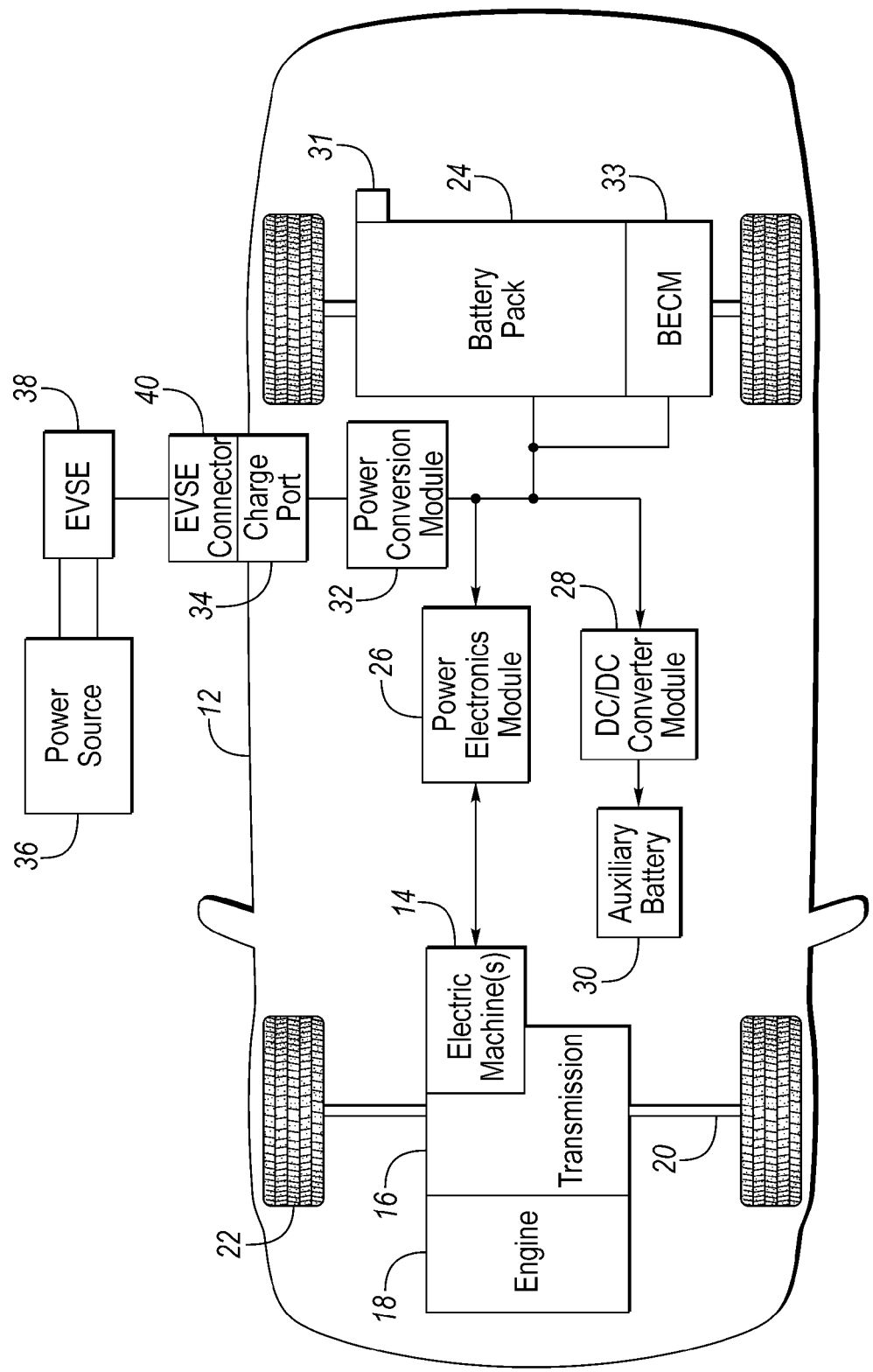
FIG. 1 is a schematic diagram of an example hybrid vehicle.

FIG. 1 depicts a schematic of a typical plug-in hybrid-electric vehicle (PHEV). Certain embodiments, however, may also be implemented within the context of non-plug-in hybrids and fully-electric vehicles. The vehicle 12 includes one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy through regenerative braking The electric machines 14 reduce pollutant emissions and increase fuel economy by reducing the work load of the engine 18.

A traction battery or battery pack 24 stores energy that can be used by the electric machines 14. The traction battery 24 typically provides a high voltage direct current (DC) output from one or more battery cell arrays, sometimes referred to as battery cell stacks, within the traction battery 24. The battery cell arrays may include one or more battery cells.

The battery cells, such as a prismatic or pouch cell, include electrochemical cells that convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another.

Different battery pack configurations may be available to address individual vehicle variables including packaging constraints and power requirements. The battery cells may be thermally regulated with a thermal management system. Examples of thermal management systems may include air cooling systems, liquid cooling systems and a combination of air and liquid systems.

The traction battery 24 may be electrically connected to one or more power electronics modules 26 through one or more contactors (not shown). The one or more contactors isolate the traction battery 24 from other components when opened and connect the traction battery 24 to other components when closed. The power electronics module 26 may be electrically connected to the electric machines 14 and may provide the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a fully-electric vehicle. In a fully-electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle components. Other high-voltage loads, such as compressors and electric heaters, may be connected directly to the high-voltage supply without the use of a DC/DC converter module 28. In a typical vehicle, the low-voltage systems are electrically connected to an auxiliary battery 30 (e.g., a 12 volt battery).

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by an external power source 36. The external power source 36 is a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via dedicated electrical conduits.

Figure 2:
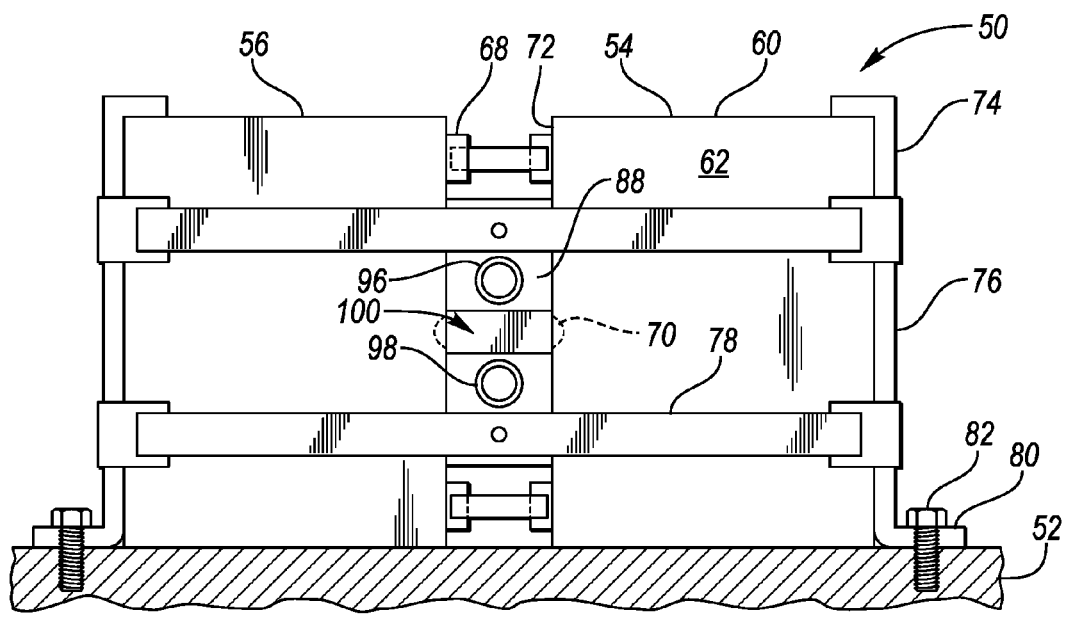
FIG. 2 is a fragmented front view of a traction battery assembly.
Figure 3:
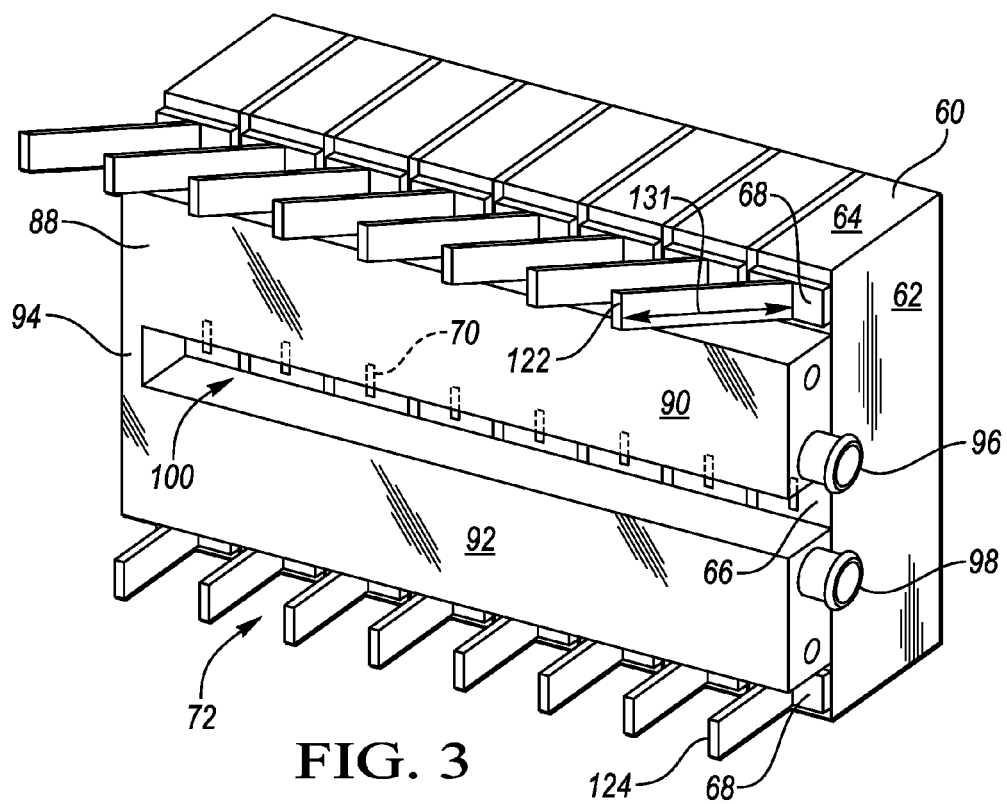
FIG. 3 is a perspective view illustrating one of the arrays, a thermal plate, and busbars of the traction battery assembly of FIG. 2.

FIGS. 2 through 6 and the related discussion, describe examples of the traction battery assembly 24. Referring to FIGS. 2 and 3, a traction battery assembly 50 includes a tray 52 and battery arrays disposed on the tray 52. For example, a first battery array 54 and a second battery array 56 may be disposed on the tray 52 in a side-by-side configuration such that the longitudinal axis (into the page) of each array is substantially parallel. Each of the arrays includes a plurality of battery cells 60. Each cell 60 includes major sides 62 and minor sides 64. Terminals 68 may extend from one of the minor sides 64. This side may be referred to as a terminal side 66 of the cell 60. Each cell 60 may include one positive terminal and one negative terminal. Each cell 60 may also include a vent 70 disposed on one of the sides. The vent 70 may be disposed on the terminal side 66 of the cell between the terminals 68. The vent 70 is configured to release gas from the internal chamber of the cell 60 when pressure inside the cell exceeds a threshold value.

The cells 60 may be stacked in a respective array with the major sides 62 of adjacent cells abutting each other. The cells 60 may be arranged in the arrays such that all of the terminal sides 66 are on a same side of the array and collectively define a terminal side 72 of the array. The arrays may be secured to the tray with bracketry 74. The bracketry 74 may include end plates 76 and tension members 78. Each of the endplates 76 includes a mounting surface 80 for receiving a fastener 82 to attach the endplates 76 to the tray 52. Alternatively, the endplates 76 are welded or bonded to the tray 52. The tension members 78 are connected between the endplates 76 and may apply compression to the arrays 54, 56. The tension members 78 may be connected to the endplates 76 via fasteners, welding, brazing, or adhesive.

The first and second battery arrays 54, 56 are positioned on the tray 52 such that the terminal side 72 of the first array 54 faces the terminal side 72 of the second array 56. A thermal plate 88 may be disposed between the first and second battery arrays 54, 56 such that at least a portion of the thermal plate 88 is touching the terminal side 66 of each cell 60. The thermal plate may be disposed between the terminals 68. The thermal plate 88 may be a U-shaped thermal plate having a first branch 90 and a second branch 92. An interconnecting region 94 may connect the first and second branches 90, 92 in fluid communication. The thermal plate 88 may also include an inlet port 96 disposed on the first branch 90 and an outlet port 98 disposed on the second branch 92. The thermal plate 88 is connected to thermal management system (not shown) via the ports and is configured to circulate coolant through the plate to selectively remove or add heat to the cells 60 as needed. The first and second branches 90, 92 may be spaced apart and define a vent channel 100. The cells 60 and the thermal plate 88 may be arranged such that the vents 70 are in fluid communication with the vent channel 100. If gas is released from the cells via the vents 70, the gas is conveyed through the vent channel and into a ventilation system (not shown) for transporting the gas outside of the vehicle cabin.

A thermal interface material (TIM) may be applied between the cells 60 and the thermal plate 88. The TIM may be a thermally conductive adhesive used to secure the thermal plate 88 in place. The thermal plate 88 may also be attached to the tension members 78 via fasteners or welding.

The thermal plate 88 is not limited to the U-shaped embodiment shown. For example, the thermal plate 88 may be rectangular. The thermal plate 88 may also include more than one thermal plate. For example, first and second thermal plates are disposed between each of the arrays. The pair of thermal plates may cooperate to define a vent channel in fluid communication with the vents.

Figure 4:
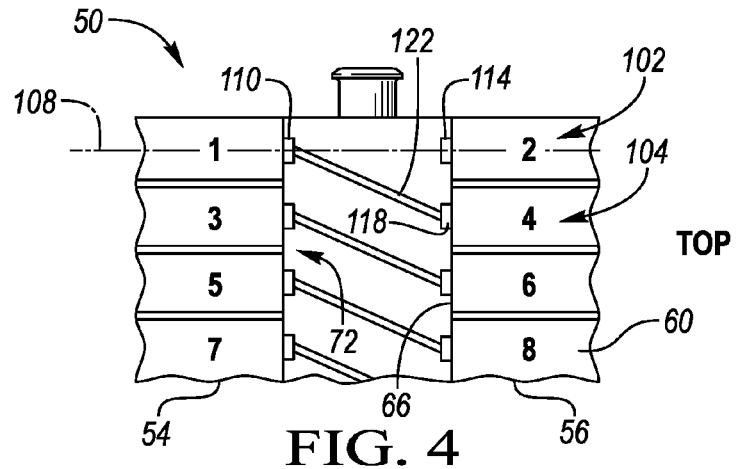
FIG. 4 is a fragmented top view of the traction battery assembly of FIG. 2 with the tray omitted.
Figure 5:
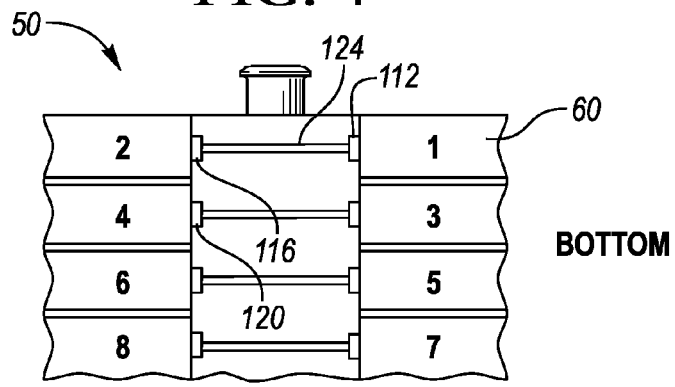
FIG. 5 is a fragmented bottom view of the traction battery assembly of FIG. 2 with the tray omitted.

Referring to FIGS. 3, 4, and 5, the first and second arrays 54, 56 may be arranged such that the cells 60 of the arrays are aligned in cell pairs. Each cell in the pair may be directly across from each other. Each cell pair includes one cell from the first array 54 and one cell from the second array 56. For example, cell 1 and cell 2 form a cell pair 102, and cell 3 and cell 4 form a second cell pair 104, etc. The cells of each cell pair may be coplanar as illustrated in FIGS. 4 and 5. For example, cells 1 and 2 both lie in plane 108. The cells in each cell pair are spaced apart to prevent inadvertent touching of the terminals, which could cause a short circuit in the traction battery. Select terminals 68 are mechanically and electrically coupled via busbars.

Each of the cells 60 may include an upper terminal and a lower terminal. For example, cell 1 includes an upper terminal 110 and a lower terminal 112. Cell 2 includes an upper terminal 114 and a lower terminal 116. Cell 4 includes an upper terminal 118 and a lower terminal 120. The lower terminal 112 of cell 1 may be mechanically and electrically coupled to the lower terminal 116 of cell 2 via busbar 124. The major axis of busbar 124 may be substantially coplanar with the cell pair 102. The upper terminal 110 of cell 1 may be mechanically and electrically coupled to the upper terminal 118 of cell 4 via busbar 122. The major axis 131 of busbar 122 may be angled between 5 and 85 degrees, inclusive, relative to the longitudinal axis of arrays 54. Thus, each cell is connected to the cell of its pair via a straight busbar, and is connected to a cell of another pair via an angled busbar. This busbar arrangement allows the first and second arrays 54, 56 to be electrically connected in a single series circuit. For example, electricity may flow from cell 2 to cell 1 to cell 4 to cell 3 to cell 6 and etc. In some embodiments, the angled busbar is on the bottom of the array and the straight busbar is on the top.

Figure 6:
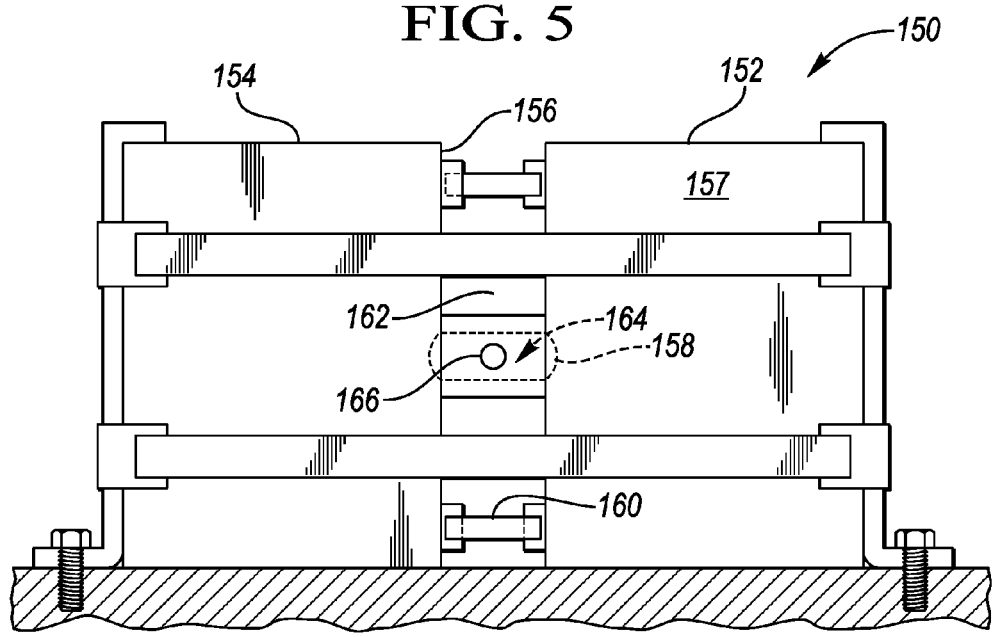
FIG. 6 is a fragmented front view of another traction battery assembly.

The thermal plate is an optional feature and is not included in all embodiments. FIG. 6 illustrates a traction battery 150 that may not include a thermal plate. The traction battery 150, similar to above, includes a first array 152 and a second array 154 positioned in a side-by-side arrangement with the terminal sides 156 facing each other. Each of the arrays includes cells 157, vents 158, and busbars 160 as described above. A vent manifold 162 may be disposed between the terminal sides 156 of the arrays. The vent manifold is in fluid communication with the vents 158 and is in fluid communication with a ventilation system (not shown) via a port 166. The manifold 162 may include a housing that defines a chamber 164 in fluid communication with the vents 158. Alternatively, the vent manifold may be a plurality of pipes having ports attached to the vents.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A traction battery assembly comprising:
   first and second arrays each including cells having terminals on a terminal side of the array, and arranged with the terminal sides facing each other; and
   a thermal plate disposed between the arrays and in contact with the terminal sides, wherein a terminal of a cell in the first array is mechanically and electrically connected to a terminal of a cell in the second array via a busbar.

2. The assembly of claim 1 wherein another terminal of the cell in the first array is mechanically and electrically connected to a terminal of another cell in the second array via another busbar.

3. The assembly of claim 1 wherein each of the cells further includes a vent arranged on the terminal side of the array.

4. The assembly of claim 3 wherein the thermal plate defines a channel in fluid communication with at least one of the vents.

5. The assembly of claim 2 wherein the cell of the first array and the cell of the second array are positioned directly across from each other.

6. The assembly of claim 5 wherein a major side of the cell of the second array is disposed against a major side of the another cell of the second array.

7. A traction battery assembly comprising:
   first and second arrays each including cells having terminals on a terminal side of the array, and arranged with the terminal sides facing each other, wherein a cell of the first array is mechanically and electrically coupled to a coplanar cell of the second array via a first busbar and to another cell of the second array that abuts the coplanar cell via a second busbar.

8. The assembly of claim 7 further comprising a thermal plate disposed between the first and second arrays and engaging with the terminal side of each array.

9. The assembly of claim 8 wherein each of the cells includes a vent disposed on the terminal side.

10. The assembly of claim 9 wherein the thermal plate defines a vent channel that is in fluid communication with at least one of the vents.

11. The assembly of claim 7 wherein each of the cells includes a major side extending substantially perpendicular to the terminal side, and wherein the cells of the first and second arrays are arranged in a stack with the major side of each of the cells engaging the major side of an adjacent cell.

12. The assembly of claim 7 wherein each of the first and second arrays defines a longitudinal axis, and the longitudinal axis of the first array is substantially parallel to the longitudinal axis of the second array.

13. The assembly of claim 12 wherein a major axis of the first busbar is substantially perpendicular to the longitudinal axes of the arrays.

14. The assembly of claim 13 wherein a major axis of the second busbar is angled between 15 and 85 degrees, inclusive, relative to the longitudinal axis of the first array.

15. A traction battery assembly comprising:
   first and second arrays each including a plurality of cells having a pair of opposing major sides and arranged in a stack such that the major sides of adjacent cells face each other, wherein each of the cells includes terminals on a terminal side extending between the major sides, wherein a first cell of the first array and a second cell of the second array are coplanar with respect to each other and are arranged with the terminal sides facing each other, and the first cell is mechanically and electrically coupled to the second cell by a first busbar and is mechanically and electrically coupled to a third cell by a second busbar, and wherein the third cell is in the second array and adjacent to the second cell.

16. The assembly of claim 15 further comprising a thermal plate disposed between and touching the terminal sides of the first, second, and third cells.

17. The assembly of claim 15 wherein a major axis of the first busbar is substantially coplanar with the first and second cells.

18. The assembly of claim 17 wherein a major axis of the second busbar is offset at an angle that is between 5 to 85 degrees, inclusive, relative to the major axis of the first busbar.

19. The assembly of claim 16 wherein the thermal plate defines a vent channel and at least one of the cells further includes a vent disposed on the terminal side and in fluid communication with the vent channel.

\* \* \* \* \*